G. A. WALKER.
COOKING OR PROCESSING APPARATUS.
APPLICATION FILED JUNE 17, 1909.
1,238,225.
Patented Aug. 28, 1917.
8 SHEETS—SHEET 1.
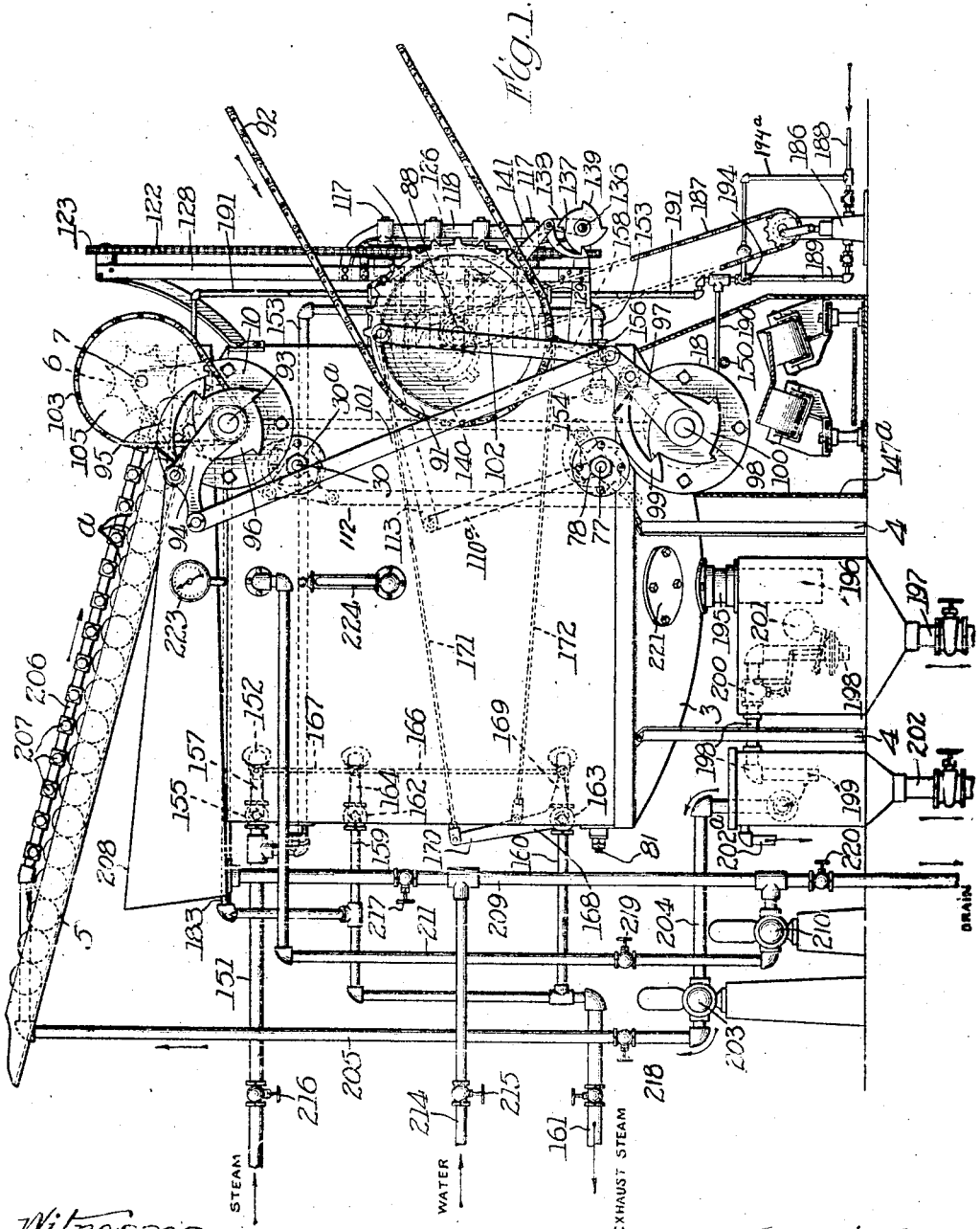

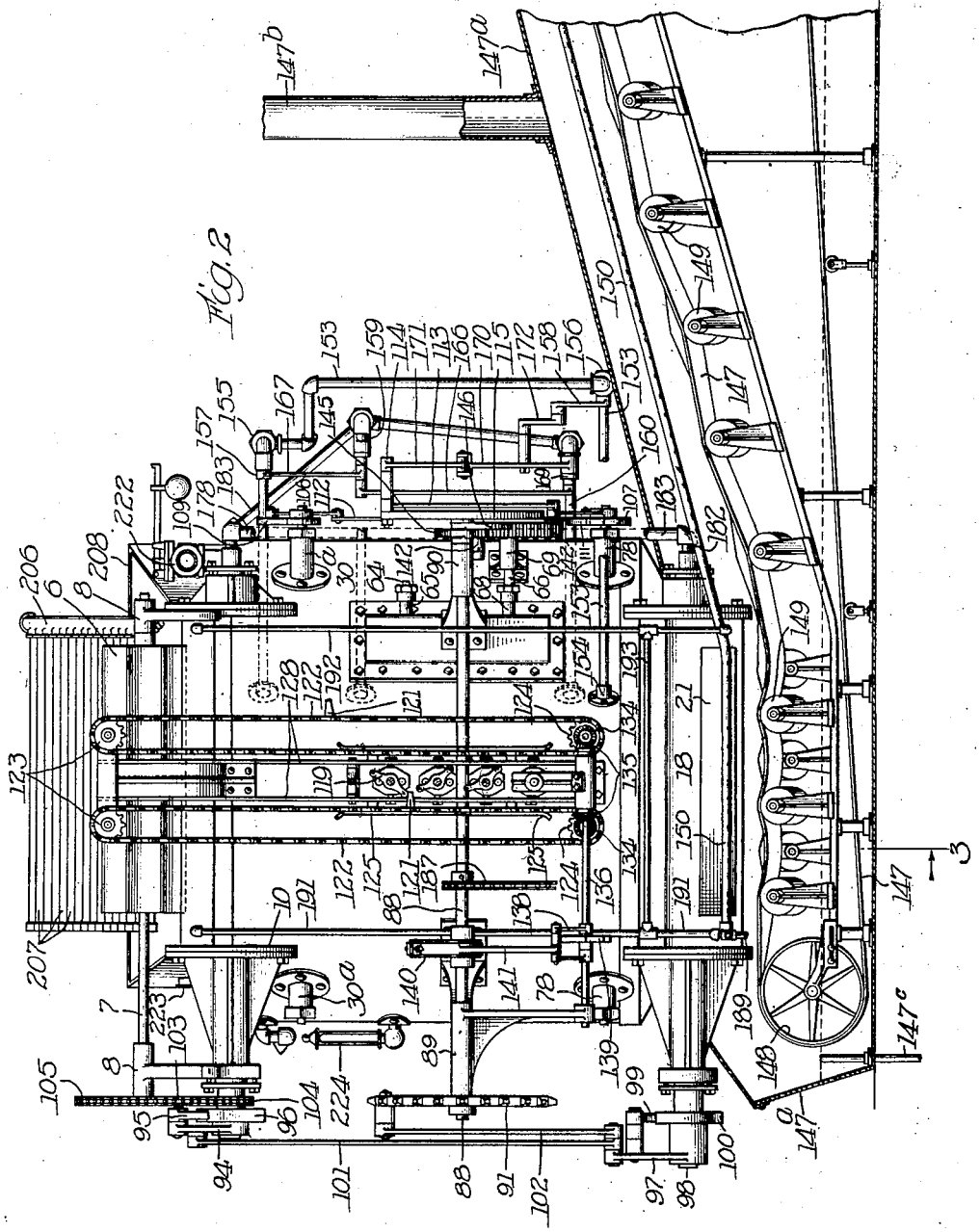

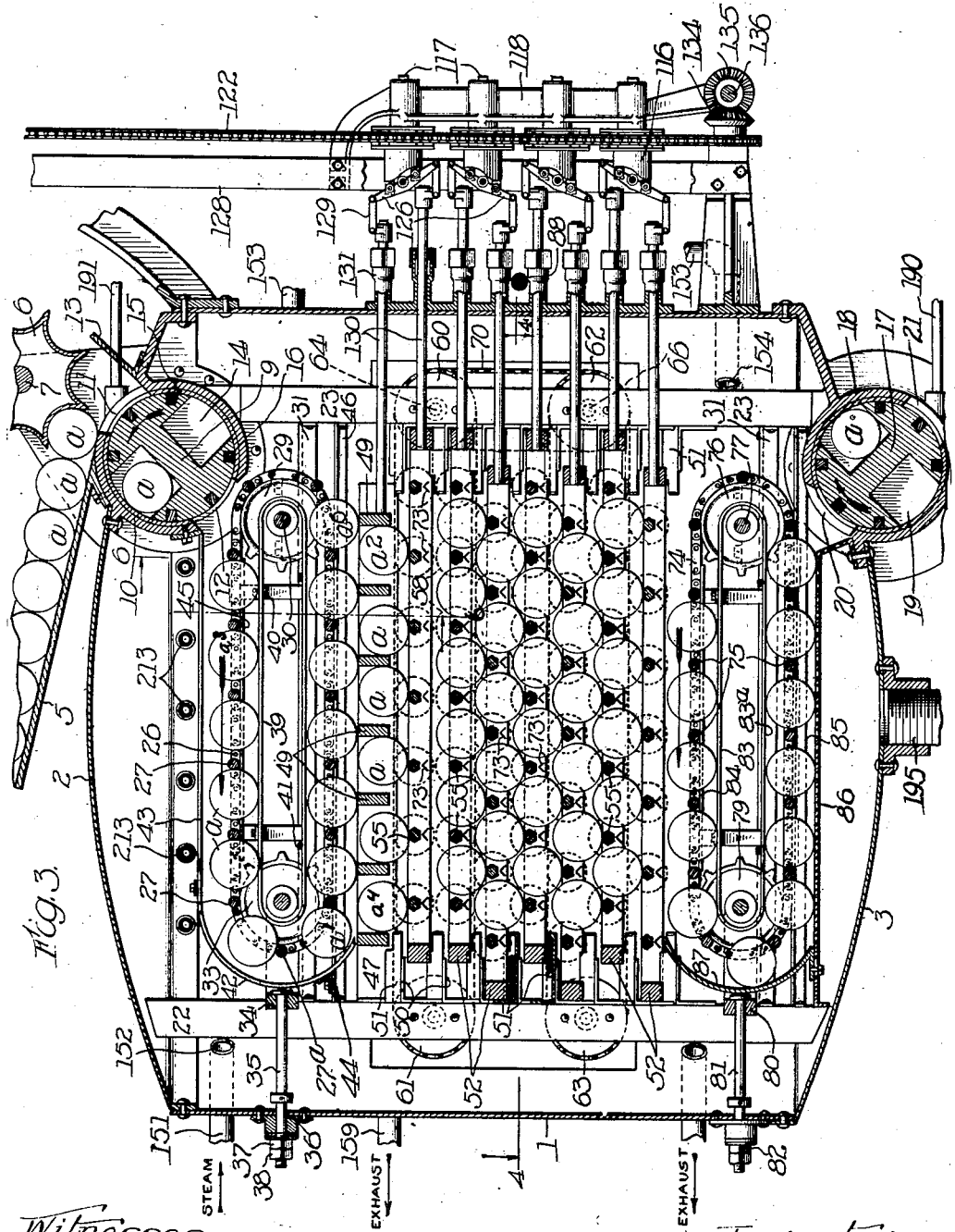

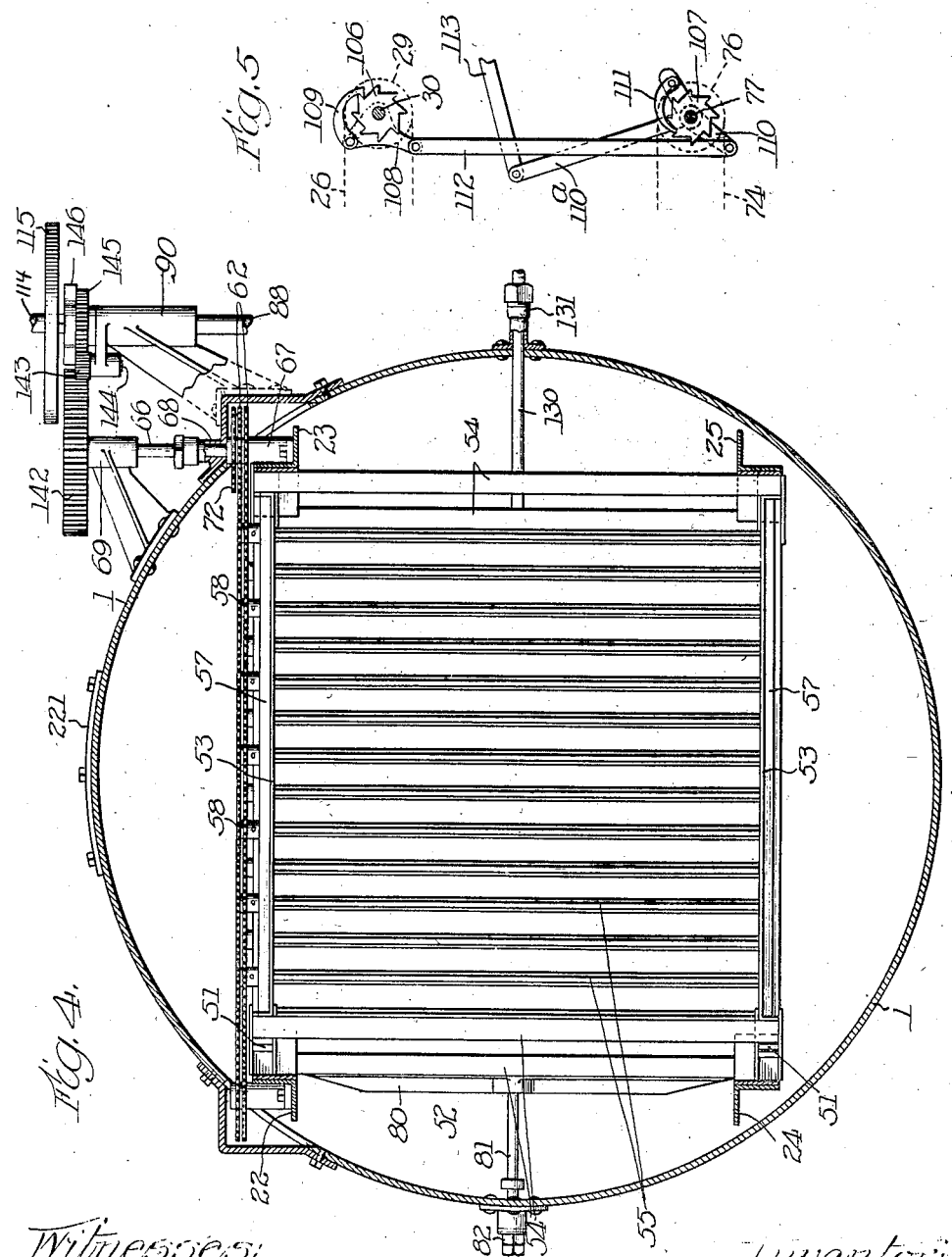

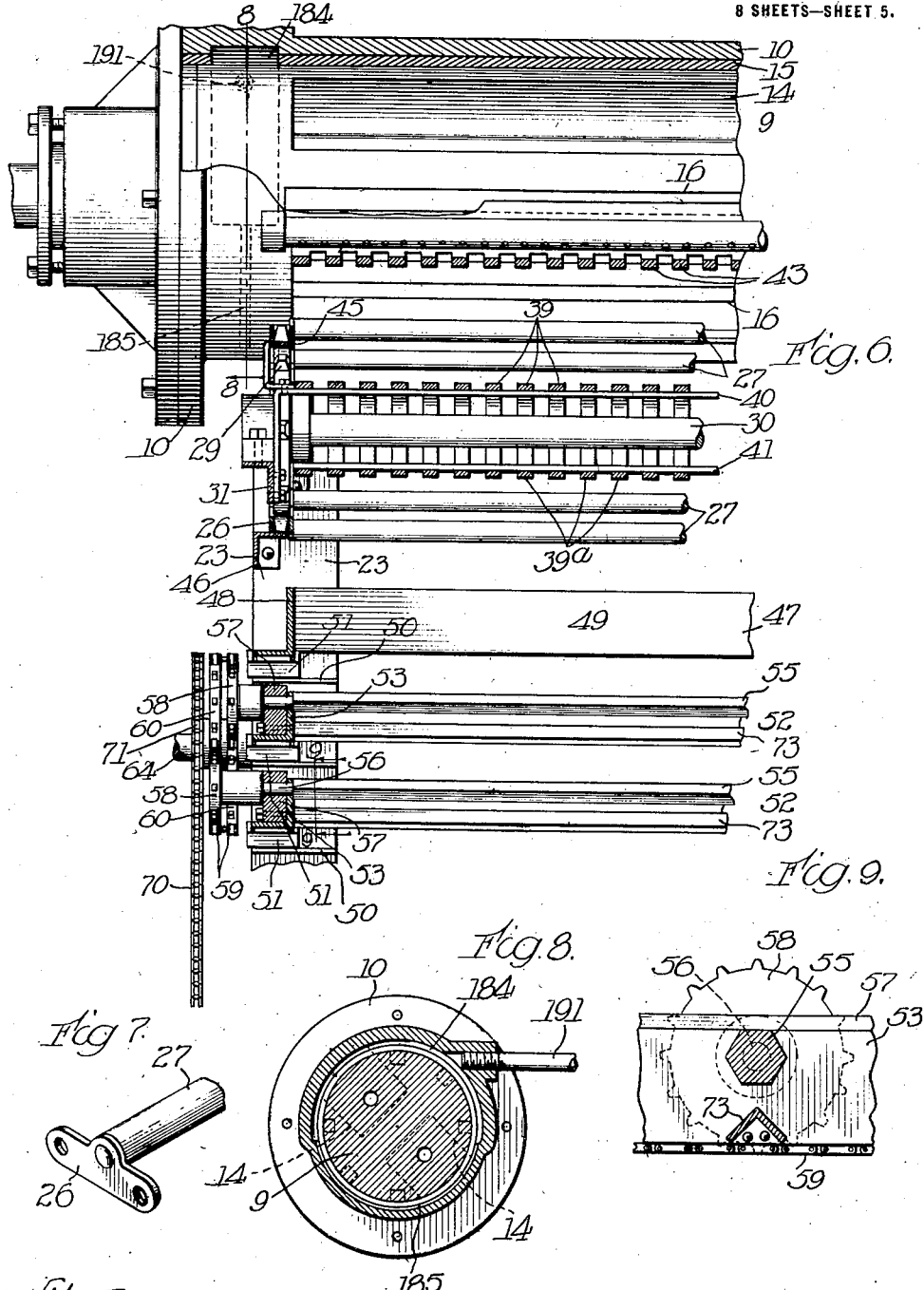

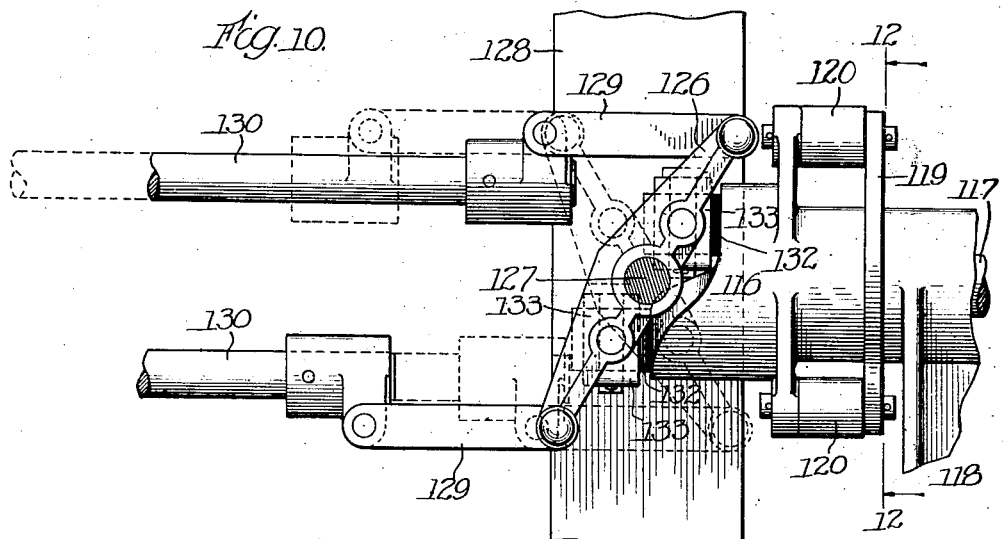
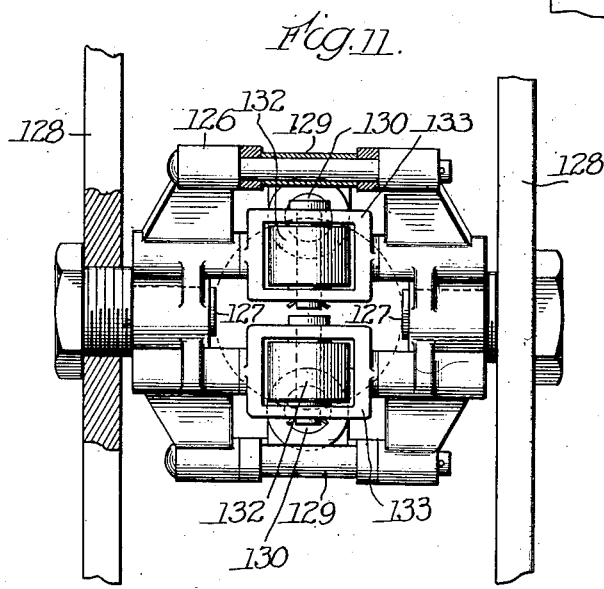
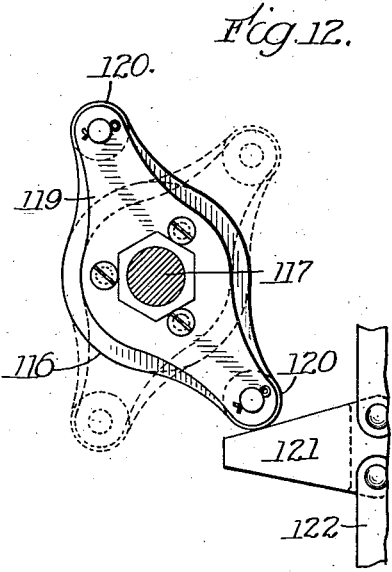
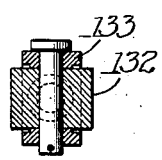

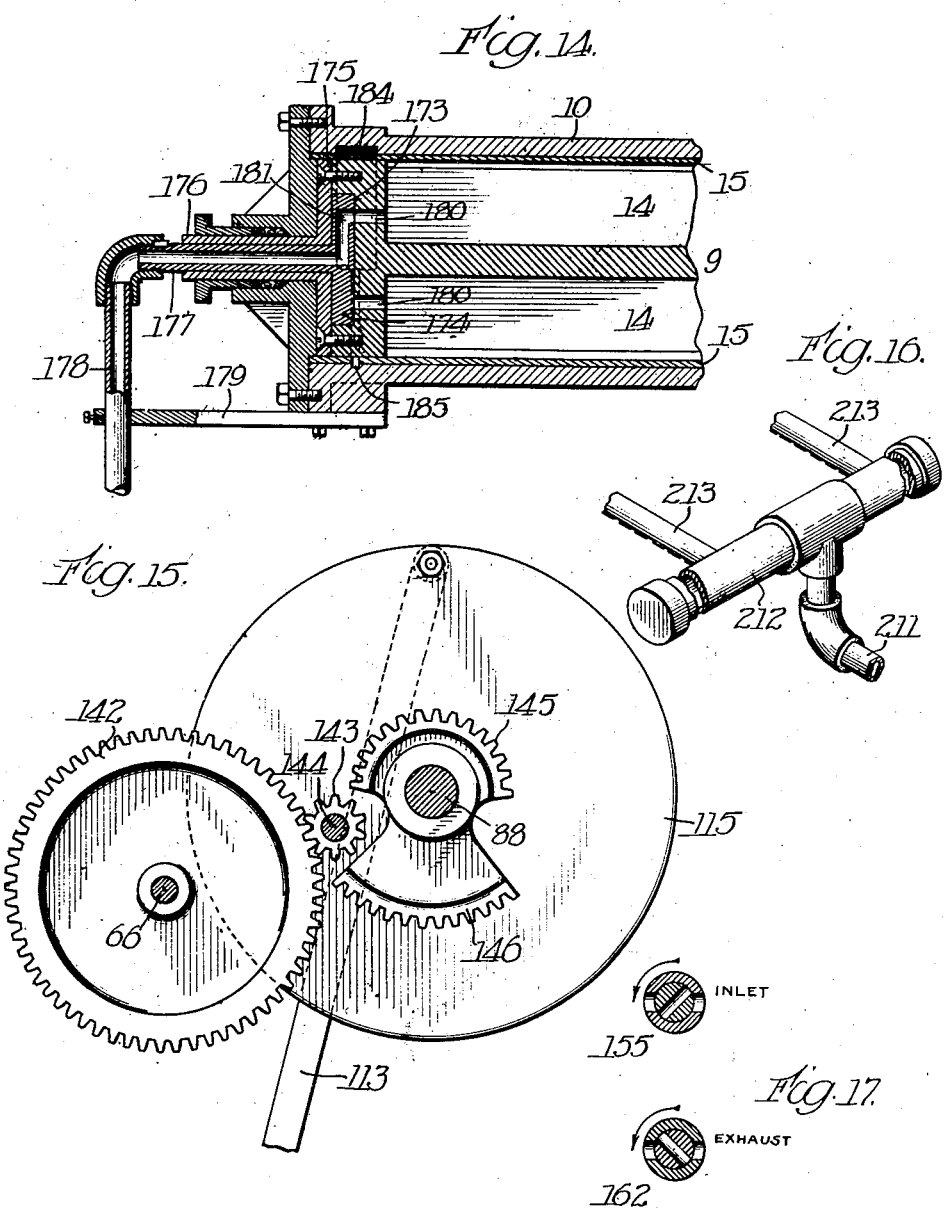

UNITED STATES PATENT OFFICE.

GEORGE A. WALKER, OF OAK PARK, ILLINOIS.

COOKING OR PROCESSING APPARATUS.

1,238,225.  Specification of Letters Patent.  Patented Aug. 28, 1917.

Application filed June 17, 1909. Serial No. 502,814.

*To all whom it may concern:*

Be it known that I, GEORGE A. WALKER, a citizen of the United States, residing at Oak Park, in the county of Cook and State of Illinois, have invented certain new and useful Improvements in Cooking or Processing Apparatus, of which the following is a specification.

This invention relates to apparatus for cooking or sterilizing packaged food-stuffs.

Certain features of the invention relate especially to apparatus of this class in which the packages gravitate through the sterilizing chamber, and one object of the invention is to simplify the means for controlling the movement of the packages through the retort or chamber.

Another object of the invention is to produce a movement-controlling means which shall permit of a very compact arrangement of the packages within the retort.

Another object is to improve the means for admitting packages to the retort.

Another object is to provide improved means for distributing the packages from the admitting means to the means for controlling the gravitating movements of the packages through the retort.

A further object is to produce improved means for conveying the packages from the movement-controlling means to the means for discharging the packages from the retort.

A further object is to provide means for cooling the treated packages.

A further object is to provide means for discharging and carrying away the treated packages in such manner as to facilitate subsequent handling.

A further object is to provide means for obtaining a circulation of the heating medium within the retort, with consequent uniformity of temperature in all portions of said retort.

The invention also relates to means for utilizing the water of condensation from the retort for raising the temperature of the packages previous to their entrance into the retort; to means for counterbalancing the pressure exerted upon the package-admitting and discharging devices by the steam within the retort; to means for exhausting the steam entrapped in the package-admitting and discharging devices during the operation of the latter; to means for agitating the packages while being sterilized; and to the general improvement of apparatus of this character.

Figure 18:
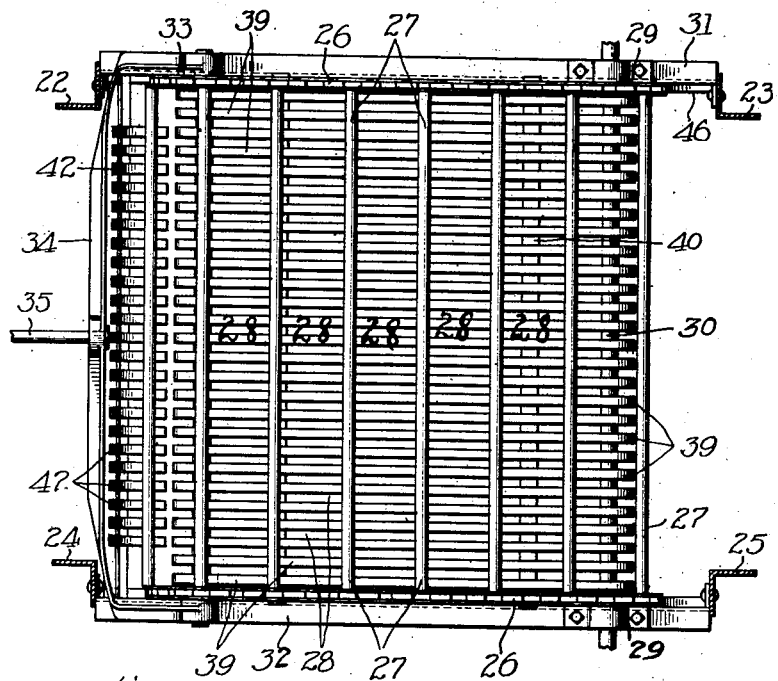

In the accompanying drawings, Figure 1 is an elevation of a cooker or processing machine embodying the features of my invention. Fig. 2 is an elevation of the machine when viewed from the right-hand side of Fig. 1. Fig. 3 is a fragmental vertical section through the apparatus taken substantially upon the plane of dotted line 3 of Fig. 2. Fig. 4 is a horizontal section through the retort on line 4 of Fig. 3. Fig. 5 illustrates the drive for the distributer and the conveyer. Fig. 6 is a sectional view taken substantially on line 6 6 of Fig. 3. Fig. 7 is a fragmental perspective view of one of the chains comprised in the distributer and the conveyer. Fig. 8 is a section on line 8 8 of Fig. 6. Fig. 9 is a fragmental view of one of the side bars of one of the package-supporting frames, showing one of the agitating shafts and the sprocket wheel for rotating said shaft. Fig. 10 is a detail view of the means for moving said package-supporting frames. Fig. 11 illustrates one of the cam-actuated levers comprised in said means. Fig. 12 is a view of one of the cams comprised in said frame-moving means, together with a portion of the chain for moving the cam. Fig. 13 is a sectional detail of one of the rollers on the cam-actuated lever. Fig. 14 is a fragmental longitudinal central section through the inlet valve. Fig. 15 illustrates a means for driving the actuating shafts alternately in opposite directions. Fig. 16 is a fragmental perspective view of certain spraying pipes. Fig. 17 illustrates diagrammatically the relative positions of certain steam inlet and exhaust valves at a given moment. Fig. 18 is a top plan view of the distributer. Figs. 19 to 23, inclusive, are views in a series, illustrating diagrammatically the manner in which the packages descend through the retort.

In the machine herein illustrated the packages pass downward step by step through the retort by the force of gravity, being supported upon grid-like frames during the intervals between downward movements, and being periodically released for further gravitating movement by changes in the relative positions of said frames. The embodiment herein shown of my invention is illustrative merely, it comprising only eight of the frames alluded to, whereas a machine of commercial size would or might contain a considerable number of said frames.

The retort or sterilizing chamber may be of any suitable form, but is herein shown as consisting of a vertically extending cylindrical shell 1 and curved top and bottom walls 2 and 3, respectively. It may be supported in any preferred manner, standards or legs 4 being herein illustrated.

The packages a are delivered to the machine by an inclined chute or runway 5 supported in any suitable way with its discharge end adjacent to the means for admitting packages to the retort. The packages travel down the chute 5 in parallel horizontal rows of, say, six packages, the packages in each row lying end to end. At the discharge end of the chute is a star wheel or roller 6 which is fixed upon a shaft 7 mounted in bearings 8 (Fig. 2) upon the retort. The periphery of the star wheel 6, in this instance, has grooves therein each adapted to receive one horizontal row of packages. As the star wheel is intermittently rotated it moves a row of packages to the package-admitting means, or permits a row of packages to roll forward to said means, at the same time holding back the next row of packages.

The package-admitting means comprises an intermittently-rotated valve 9 (Fig. 3) mounted in a valve casing 10 which is located in the upper portion of the retort. Said valve casing has an inlet opening 11 at the discharge end of the chute and an outlet opening 12 in the interior of the retort. At the side of the opening 11 opposite the chute 5 is a stop plate 13 to prevent packages from rolling beyond said opening. The valve 9 has formed therein two diametrically opposite compartments 14 extending longitudinally of the valve and arranged to be brought into register with the openings 11 and 12 in the rotation of said valve. Each of said compartments is of sufficient size to contain a row of packages.

The valve 9 and its casing 10 are conveniently made of cast iron. In order to reduce wear upon said parts, I preferably provide the valve casing with a cylindrical lining 15 of steel or other suitable material, the lining preferably having a driving fit with the casing. The lining 15 may be removed when renewal is desirable. The openings 11 and 12 in the casing are, of course, extended through the lining, as shown in Fig. 3. The valve 9 may be provided with suitable packing illustrated diagrammatically at 16 in Figs. 3 and 6.

As shown in Fig. 3, the inlet valve device is arranged so that the compartments 14 are inclined at an angle of forty-five degrees from the vertical when in the receiving and discharging positions, therefore the cans rest upon the bottom of the compartments during the greater part of the time that they are in the valve, and contact the valve casing only for a short distance, hence the packages cause but little wear upon the casing.

The means for discharging the treated packages from the retort comprises a rotatory valve 17 substantially identical in construction with the valve 9 and mounted within a valve casing 18. The compartments 19 in the discharge valve 17 are arranged to register with the inlet opening 20 and the outlet opening 21 of the casing 18. The casing may be lined, and the valve packed, as in the case of the admission valve device.

The package-supporting frames, the means for distributing packages from the inlet valve 9 to said frames, and the means for conveying packages from said frames to the discharge valve 17 are supported within the retort by four uprights 22, 23, 24 and 25 (Fig. 4) rigidly attached at their upper and lower ends in any suitable manner to the upper and lower walls of the retort.

The distributer comprises two endless chains 26 connected together by transverse parallel bars 27. Between the chains 26 and the bars 27 are formed spaces 28 (Fig. 18) each of sufficient length and width to receive a single row of packages. The chains 26 are supported upon two sprocket wheels 29 fixed upon the shaft 30, which shaft is mounted in bearings 30ª in the retort walls and in bearings carried by a bar 31 extending between the uprights 22 and 23, and a similar bar 32 (Fig. 18) extending between the uprights 24 and 25. The chains 26 also extend over sprocket wheels 33 which are mounted on stub shafts on the ends of a yoke 34, said yoke being slidably supported on the bars 31 and 32. In order to permit of taking up slack in the chains 26, the yoke 34 is provided with a stem 35 (Fig. 3) which extends through the retort wall at 36 and is screw-threaded to receive an adjusting nut 37 and a lock nut 38. Endless strips or bars 39 are rigidly connected together in parallel relation by bars 40 and 41, the last mentioned bars being fixed to and supported by the bars 31 and 32. The bars 39 form a floor over which the rows of packages are pushed by the bars 27, said floor extending from a point adjacent to the inlet valve 9 to the sprocket wheels 33, and being curved on the arc of a circle concentric with the axis of said sprocket wheels, to support the packages while the latter are passing from the upper run to the lower run of the chains 26. The lower portions of the strips 39 form a guard 39ª, the purpose of which will appear hereinafter. A guard 42 curved upon the arc of a circle concentric with the axis of the sprocket wheels 33 is fixed in position to guide the packages while passing from the upper to the lower runs of the chains 26. The upper portion of the guard 42 is continued in a guard 43 which extends to the valve casing 10. The guards 42 and 43 may be formed of parallel strips or of a slotted piece of sheet metal, as indicated in Figs. 6 and 18, and secured in place in any suitable manner, as by attachment to the valve casing 10 and a transverse frame bar 44. The upper runs of the chains 26 are supported upon rails 45. 46 are rails for supporting the lower runs of said chains.

As shown in Fig. 3, one end of the distributer extends into position to receive the packages as they fall through the opening 12 of the valve casing, the lower side of the distributer being disposed directly above a tier of horizontal structures constituting package-supporting frames.

47 designates the uppermost frame. Said frame comprises, in this instance, side bars 48 in the form of angle irons and transverse parallel bars or partitions 49. Said frame is slidably supported upon brackets 50 fixed to the uprights 22, 23, 24 and 25 said brackets carrying roller bearings 51 of any suitable construction. The parallel partitions 49 form between them spaces of suitable length and width to receive rows of packages.

The frames 52 are substantially similar to the frame 47 and comprise in their construction the angle-iron side bars 53 and the end bars 54, said frames being slidably mounted upon roller bearings 51. Each frame 52 carries transverse partitions or bars which serve alternately to hold rows of packages in said frame against lateral displacement and to support packages lying within the next higher frame. In order that said partitions may be utilized as a means for imparting agitation to the contents of the packages, I make each of said partitions of two parts, the part 55 being rotatable and the part 73 being fixed in position. The parts 55 and 73 extend from one of the side bars 53 to the other. The parts 55 may be in the form of rotatable shafts of suitable cross-section, as, for example, of hexagon form, as shown in Fig. 9. The journals 56 of said shafts are mounted in bars 57 (Figs. 4 and 6) secured to the outer sides of the side bars 53 of the frame. Fixed upon said journals are sprocket wheels 58 arranged to be engaged by sprocket chains 59 running over sprocket wheels 60, 61, 62 and 63. The sprocket wheels 61 63 are carried by stub shafts on the upright 22; the sprocket wheel 60 is fixed upon a shaft 64 mounted in a bearing on the upright 23 and in a bearing 65 (Fig. 2) on the retort; and the sprocket wheel 62 is fixed upon a shaft 66 (Figs. 2 and 4) supported in a bearing 67 on the upright 23 and in bearings 68 69 on the retort.

The chains 59 are so arranged that each drives the sprocket wheels 58 carried by several frames 52. As herein shown, the upper chain 59 drives the agitating shafts in the upper three frames, while the lower chain rotates the shafts in the lower four frames. (See Fig. 3). In order to prevent interference between the sprocket wheels as the frames are reciprocated, the sprocket wheels on one frame are located out of the vertical plane of the sprocket wheels on the next adjacent frame, as shown in Fig. 6, and the chains 59 are made double so as to be wide enough to engage with the sprocket wheels 58. The sprocket wheels 60 62 are of double construction to carry the double chains 59. The shaft 64 is driven from the shaft 66 through the medium of a chain belt 70 running over sprocket wheels 71 72 fixed on said shafts.

Directly below each shaft 55 upon the frames 52 is the partition-section 73 which may be in the form of an angle iron, as indicated in Figs. 3 and 9.

The device for conveying the packages from the tier of frames 47 52 to the discharge valve 17 is similar to the distributer, and comprises two chains 74 connected by parallel transverse rods 75. Said chains are carried around sprocket wheels 76 fixed upon a shaft 77, which shaft is mounted in bearings 78 upon the retort (Fig. 2). Said chains also extend over sprocket wheels 79 mounted upon the arms of a yoke 80, which yoke is slidably supported as in the case of the yoke 34, and may be moved to take up slack in the chains 74 by means of a stem 81 and an adjusting nut 82. 83 is a floor or runway of slat construction similar to the floor 39, and 83$^a$ is a guard similar to the guard 39$^a$. The upper runs of the chains 74 are carried by rails 84, while the lower runs of said chains are supported by bars 85. Beneath the conveyer is a perforated floor 86. A curved plate 87 guides the packages in passing from the upper to the lower run of the conveyer.

A drive shaft 88 is supported in bearings 89 90 (Fig. 2) upon the retort, power being communicated to said shaft in any suitable manner, as, for example, by means of a sprocket wheel 91 and a drive chain 92. Pivotally mounted upon the journal 93 of the inlet valve is an arm 94 carrying a spring pressed pawl 95 which is adapted to engage the teeth on a ratchet wheel 96 fixed upon said journal. A similar arm 97 is loosely mounted on the journal 98 of the discharge valve, and carries a spring-pressed pawl 99 arranged to engage a ratchet wheel 100 fixed on said journal. The arms 94 and 97 are of equal length and are connected by a link 101. A pitman 102 connects the crank arm 97 with a wrist pin upon the driving sprocket wheel 91. Thus, as said sprocket wheel is rotated, the inlet valve and the discharge valve are intermittently rotated in unison, each being moved through one-fourth of a revolution at a time.

The star wheel 6 is driven by means of a chain belt 103 extending over sprocket wheels 104 and 105 on the journal 93 of the inlet valve and the shaft 7 of the star wheel, respectively. The sprocket wheels 104 and 105 are so proportioned that two movements of the valve 9 are required to advance a row of packages into position to drop into a compartment in said valve, the packages being released by the star wheel as a compartment comes into register with the opening 11.

The assembler and the conveyer are intermittently driven in unison by means of ratchet wheels 106 and 107 (Fig. 5) fixed on the shafts 30 and 77, respectively. Loose on the shaft 30 is an arm 108 carrying a pawl 109 adapted to engage the teeth of the ratchet wheel 106. A lever 110 pivotally mounted between its ends on the shaft 77 carries a pawl 111 arranged to engage the ratchet wheel 107. The arm 108 and the lever 110 are connected by a link 112. One arm 110$^a$ of the lever 110 is connected by a rod 113 to a wrist pin 114 carried by a crank disk 115 fixed upon one end of the drive shaft 88.

It will be seen from Figs. 1 and 5 that as the arms 97 and 110$^a$ are swung downwardly in the rotation of the shaft 88 the inlet and discharge valves will be moved through a quarter-revolution (*i. e.*, through one-half the length of movement necessary to admit or discharge a row of packages) while the distributer and conveyer remain stationary; and that as said arms swing upwardly the distributer and the conveyer will move through one-half the distance necessary to bring one of the package-receiving spaces in said distributer and conveyer into operative relation to the inlet and discharge valves, and said valves will be at rest.

The frames 47 and 52 are reciprocated by means herein shown as comprising cams 116 (Figs. 3, 10 and 12) fixed upon the shafts 117 which are supported in a post 118 forming a part of the rigid framework of the machine. Fixed to each of the cams 116 is a two-arm lever 119 carrying at each of its ends an anti-friction roller 120. The ends of each of said levers are arranged to be alternately engaged by lugs 121 (Fig. 2) carried by endless chains 122, said chains extending over sprocket wheels 123 and 124. The chains are arranged in a vertical position and parallel with each other and with the tier of shafts 117. Suitable backing 125 may be provided at one side of the inner run of each chain to hold the chain in proper relation to the levers 119. The chains are driven so that the inner or adjacent runs thereof travel upwardly. After one of the lugs 121 has tilted all of the levers 119 singly and in regular succession in one direction, they remain in such position until the lug 121 upon the opposite chain reaches said levers, when they are successively tilted in the opposite direction. The cams fixed to said levers 119 operate upon levers 126 which are pivotally mounted between their ends upon pivots 127 carried by two parallel vertically-extending bars 128. The ends of the levers 126 are connected by means of links 129 with the outer ends of rods 130, said rods being slidably mounted in stuffing boxes 131 and having their inner ends rigidly secured to the frames 47 and 52. Upon the levers 126 are mounted anti-friction rollers 132 adapted to be engaged by the cams 116. The abruptness and relatively short radius of said cams make it desirable to mount the anti-friction rollers 132 in frames 133 which are pivoted upon the levers 126 to swing upon an axis extending at right angles to the axis of the rollers. As the cams 116 are rotated, the levers 126 are tilted first in one direction and then in the other to reciprocate the frames 47 and 52. As shown in Fig. 3, two adjacent frames are attached to each lever 126, and hence will be simultaneously moved in opposite directions when said lever is rocked by its cam 116.

The sprocket wheels 124 are driven by means of bevel gears 134 (Figs. 2 and 3) fixed to said sprocket wheels and meshing with bevel gear wheels 135 fixed on a shaft 136. As herein shown, the shaft 136 is intermittently rotated by means of a pawl 137 (Fig. 1) carried by an arm 138 loosely mounted on said shaft, said pawl engaging a ratchet wheel 139 on the shaft. The arm 138 is rocked by an eccentric 140 on the drive shaft 88, the strap of said eccentric being connected with the arm 138 by means of a rod 141.

The agitator shafts 55 are driven by means comprising a gear wheel 142 (Figs. 2, 4 and 15) fast on the shaft 66 and arranged to mesh with a pinion 143 mounted on a stud 144 fixed to the retort. The pinion 143 is adapted to mesh with a mutilated gear 145 fixed on the drive shaft 88. The gear wheel 142 is of sufficient width to mesh with a mutilated gear 146 fixed on the shaft 88 and diametrically opposite the mutilated gear 145 but in a different vertical plane. The parts 145 and 146 may be integral, as herein shown. Spaces are provided between the ends of the series of teeth on the gear 145 and the adjacent end of the series of teeth on the gear 146. The mutilated gear 145 through the medium of the pinion 143 imparts rotation to the gear wheel 142 (and consequently to the agitating shafts 55) in the opposite direction to that caused by the engagement of the mutilated gear 146 with said gear wheel, the latter and the agitating shafts being at rest during the intervals between the passage of one of said mutilated gears out of mesh and the entrance of the other. It will be understood that the shafts 55 are driven at such speed as to produce the agitation required for the goods to be treated.

The rows of packages discharged from the valve 17 fall upon a conveyer consisting, in this instance, of a belt 147 carried by means comprising a wheel 148 and two rows of rollers 149. The axes of the rollers 149 are inclined so as to permit the upper run of the belt 147 to assume a concave form. Preferably water is sprayed upon the packages lying on the conveyer, to cool them, the means herein shown for this purpose consisting of a perforated pipe 150. In order to agitate the packages and thereby expedite the cooling thereof, the belt may be caused to undulate, as by staggering the rollers of one row with reference to the other, as shown at the receiving end of the conveyer in Fig. 2, or by supporting alternate rollers 149 in a row at a different height from that of the other rollers in the row, as also shown in Fig. 2, the elevated rollers in one row being placed opposite the low rollers in the other row, in order to cause the belt to undulate as it travels upward, thereby rolling the cans from side to side and tilting them endwise. Any suitable means may be used to drive the conveyer 147. In order to exclude air and prevent the escape of steam into the room, the conveyer is preferably inclosed within a casing or tank 147ª having a vent pipe 147ᵇ to carry off the vapors. In this instance, the water is drained from the tank through a pipe 147ᶜ. It will be seen that the packages are not discharged into a body of water, where it would be difficult to control their movements, but, on the contrary, are received upon the upper run of the belt 147 which is always above any body of water there may be in the tank 147ª. The cooling water is sprinkled directly upon the packages.

The conveyer 147 may carry the cooled packages to the receiving chute of a boxing machine (not shown). For convenience in delivering the packaegs to said machine, I have arranged the discharge valve and the conveyer, as herein shown, with the compartments 19 extending longitudinally of the conveyer, so that the rows of packages discharged from the compartments shall lie lengthwise of the conveyer and be carried off in a line or single file, the conveyer moving rapidly enough to move a row of packages out from under the opening 21 before another row of packages is discharged.

The retort is heated, in this instance, by means of steam. In order to insure uniform temperature within the retort and an efficient circulation throughout all portions of the retort, steam is admitted alternately to the upper and lower portions of the retort, and at opposite sides thereof. 151 (Fig. 1) is a steam supply pipe extending into the upper portion of the retort at the left-hand side thereof at 152. A branch pipe 153 extends from the pipe 151 to the lower right-hand side of the retort and communicates with the interior of the retort at 154. In the pipes 151 and 153 are located valves 155 and 156 each provided with an operating arm 157 and 158, respectively.

Steam is exhausted alternately from the upper and lower portions of the retort through the pipes 159 and 160, said pipes being connected with the common exhaust pipe 161. In each of the pipes 159 and 160 is a valve 162 and 163, the valve 162 having an operating arm 164.

The operating arm 157 of the inlet valve 155, and the arm 164 of the exhaust valve 162 are joined by a link 167. Fixed upon the stem of the valve 163 is a bell-crank lever 168, one arm 169 of which is connected to the arm 164 by a link 166, the other arm 170 of said bell-crank lever being connected with the wrist pin 114 (Fig. 2) by a link 171. The operating arm 158 of the steam-inlet valve 156 is connected with the arm 170 of the bell-crank lever by means of a link 172. As the wrist pin 114 revolves, the bell-crank lever 168 will be tilted to open the inlet valve 156 and the exhaust valve 162, as indicated by the arrows in Fig. 17, the inlet valve 155 and the exhaust valve 163 being closed. As the bell crank lever swings in the opposite direction, the inlet valve 156 and the exhaust valve 162 will be closed, and the inlet valve 155 and the exhaust valve 163 will be opened, admitting steam into the upper portion of the retort and permitting its exit from the lower portion thereof.

It will be understood that when the compartments of the valves 9 and 17 are rotated into communication with the interior of the retort, said compartments will be filled with steam at high pressure, which steam will be entrapped in the compartments as the valves continue rotating. In order to prevent the escape of the entrapped steam into the room in which the apparatus is located, I provide the below described means for discharging the entrapped steam into the exhaust pipe 161.

Referring to Fig. 14: In one end of the inlet valve 9 is an annular recess 173 within which is a stationary disk 174. Fixed to the end of said valve and overlying the disk 174 is a disk 175 having a stem 176 thereon which constitutes a trunnion or journal for the valve. The trunnion 176 is tubular to receive a tubular stem 177 upon the disk 174. Rigidly attached to the outer end of the stem 177 in any suitable manner is an exhaust pipe 178. The pipe 178 may be held against any tendency to rotation or movement by means of a bracket 179 fixed to the valve casing 10.

In one end of each of the compartments 14 is a port 180 arranged to be brought into register during the rotation of the valve 9 with a port 181 formed in the stationary disk 174, the last mentioned port communicating with the tubular stem 177. As will be readily understood, after the valve has been rotated to carry one of the compartments 14 out of register with the opening 12, the port 180 for said compartment will come into register with the port 181, whereupon the steam entrapped in said compartment will escape through said ports and the tubular stem 177 into the exhaust pipe 178.

A valve mechanism similar to the one just described is provided for the discharge valve 17, the pipe 178 extending to and being connected with the tubular stem 182 (Fig. 2) of said valve mechanism. The pipe 178 communicates with the pipe 159 through the medium of a pipe 183.

The pressure within the retort, exerted upon the inlet valve 9 and the discharge valve 17 through the openings 12 and 20, obviously tends to prevent said valves from rotating freely. In order to counterbalance this pressure, I provide in each end of each inner valve casing 10 and 18, in the inner wall thereof, a groove or chamber 184 (Figs. 6, 8 and 14) which communicates with a suitable source for supplying water under pressure. Said grooves or chambers are diametrically opposite the inlet opening of the valve casing, and are of sufficient area proportionately to the pressure of the water, to substantially counterbalance the pressure of the steam upon the valve. Preferably a narrow groove 185 is formed in the inner face of the valve casing at each end thereof and in communication with the adjacent chamber 184 in order to provide water packing to prevent leakage of steam from the valve. The chambers 184 and grooves 185, in this instance, are extended through the lining 15.

The means for furnishing the counterbalancing hydraulic pressure is herein diagrammatically shown as a pump 186 (Fig. 1) driven from the drive shaft 88 through the medium of a chain belt 187. The suction side of the pump communicates with a pipe 188 and the pressure side thereof with a pipe 189. The latter pipe communicates with a pipe 190 leading to the counterbalancing chamber in one end of the valve casing 18, and with a pipe 191 extending to the similar chamber in one end of the valve casing 10. A pipe 192 is connected at its upper and lower ends with the counterbalancing chambers in the opposite ends of the valve casings 10 and 18 and is connected with the pipe 191 through a pipe 193. A pressure regulator of any common or preferred construction is indicated diagrammatically at 194, said regulator being arranged to divert the flow from the pipe 189 to a by-pass 194ª when the pressure rises above a predetermined point.

Condensation and solid matter escaping from any packages that may burst are drawn from the lower end of the retort through the pipe 195 into a settling tank 196. The lower end of said tank is provided with a valved outlet pipe 197 through which the solids may be discharged whenever necessary or desirable. The water of condensation passes from the settling tank 196 through a pipe 198 into a tank 199, the flow through said pipe being controlled by a balanced valve 200 actuated by a float 201. The tank 199 is provided with the valved drain pipe 202 and with an overflow pipe 202ª.

The temperature of the sealed packages when they arrive at the cooker may be perhaps 180° Fahr. In order to raise the temperature of the packages as much as possible previously to admitting them to the retort, and at the same time utilize the heat contained in the water of condensation, said water may be sprayed upon the cans prior to their entrance into the retort. I have herein shown a pump 203 of any suitable construction arranged to pump water from the tank 199 through pipes 204 and 205 to a pipe 206 extending longitudinally of the runway 5 near one side thereof. Perforated pipes 207 having closed outer ends are connected with the pipe 206 and extend transversely of the runway above the path of the packages. The water sprayed upon the packages is collected in a shallow receptacle 208 located upon the retort. Water is drawn from said receptacle through a pipe 209 by a pump 210 and discharged through a pipe 211 into a header 212 (Fig. 16) extending within the upper portion of the retort. To said header are attached perforated pipes 213 so arranged as to spray the water upon the packages being sterilized. In order that a supply of cool water may be had immediately upon putting the apparatus into operation, and at any other desired time, the pipe 209 is connected with a suitable source of supply by means of a pipe 214.

Valves may be provided in the piping wherever necessary, as at 215, 216, 217, 218, 219 and 220. 221 indicate manholes, 222 (Fig. 2) a safety valve, 223 a steam gage, and 224 a thermometer.

The conveyer belt 147 which moves the packages under, and then away from, the spray pipe 150 may move continuously or intermittently, it being required, in the present construction, only that between the time the valve 17 discharges a row of six cans onto said conveyer belt and the next succeeding discharge of cans, said conveyer belt shall move at least far enough to carry the first discharged cans from under the opening 21.

It is not required that the speed with which the agitating shafts 55 revolve shall bear any fixed relation to the movements of the other parts of this machine; however, it may be desirable to change the proportions of the parts which impart rotary movement to said shafts 55 so as to furnish a different amount of rotary movement and consequent agitation to the packages supported by said shafts 55 when treating certain materials, than they would receive when said parts are proportioned as shown.

In the present embodiment, the movements of all parts other than the conveyer belt 147 and the shafts 55 bear a fixed relation to each other, and these parts may be classified according to their movements, into two groups, the parts in each group moving in unison and intermittently, and the movements of each group alternating with the movements of the other group, or in other words, the movements of the parts of each group take place during the idle period of the parts in the other group. The parts included in one group, which may be termed the "first group", are the star wheel 6, the inlet valve 9, the frames 47 52, and the discharge valve 17, the parts included in the other group, which may be termed the "second group", being the distributer and the conveyer 74.

Every other movement of the conveyer 74 releases a row of packages, the releasing movement occurring a few moments after a compartment 19 in the valve 17 has been brought into register with the opening 20. Upon the completion of eight movements of the conveyer 74 from the position shown in Fig. 3, the upper side of said conveyer will be empty, and the lowermost two frames 52 will be shifted to release the lowest horizontal layer of packages. The shifting of said frames 52 takes place when the cross-bars 75 of the conveyer 74 are directly under the partitions in the lowermost frame 52 and when the conveyer is at rest; therefore when said frames 52 shift, the packages thereby released will move downward to a position of rest upon the cross-bars 75, and the next movement of the conveyer 74 will allow them to move downward until they receive the support of the runway 83. The shifting of the second frame 52 from the bottom will withdraw said frame from beneath the second layer from the bottom (Fig. 3), which layer immediately descends into the spaces vacated by the layer now in the conveyer. The layers of packages thus descend as the frames are shifted during the upward movement of a lug 121 on one of the frame-operating chains 122, two layers moving downward at a time.

Figure 19:
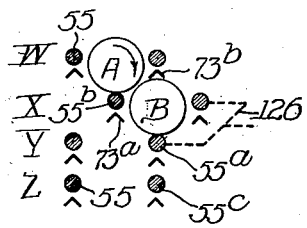

Figs. 19 to 23, inclusive, illustrate diagrammatically the course of a package downward through the frames 52. Said figures show portions of four adjacent frames W X Y Z. In Fig. 19 all of the frames are stationary, the frame Z having completed a movement by which the packages supported upon its shafts 55 were permitted to descend. Frames X and Y are about to be shifted. While a frame is being shifted it moves continuously. In the diagrams, Figs. 19 to 23, the packages are represented as in an upright position on the shafts 55 below them, but it will be understood that in practice the packages lean against the shafts 55 at opposite sides of the packages.

Figure 20:
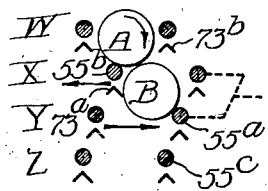

Fig. 20 represents frames X and Y as having moved a short distance (in the directions indicated by the arrows) from the positions shown in Fig. 19. The package B is supported by a shaft $55^a$ of said frame Y and by a member $73^a$ of the frame X. The package B will descend out of the frame X as soon as the distance between said shaft $55^a$ and said member $73^a$ exceeds the diameter of the package. It will be seen that the package A will not be released until after the package B has descended, since the distance between said shaft and said member is increasing twice as fast as the distance between the member $73^b$ of the frame W and the shaft $55^b$ of the frame X is increasing. This is for the reason that the points $55^a$ and $73^a$ are moving away from each other, whereas the point $73^b$ is stationary.

Figure 21:
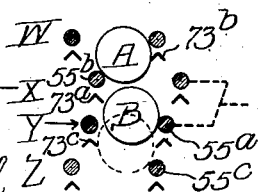

In Fig. 21 the frames X and Y are represented as having moved far enough to permit the package B to slip between the shaft $55^a$ and the member $73^a$ and drop into the position indicated by dotted lines in said figure. The package A is still supported by the shaft $55^b$ and the member $73^b$. In this figure the parts are represented in the positions they occupy when the package B is released. Before said package contacts the shaft $55^c$ and the member $73^c$ the frame Y would have moved somewhat farther to the right than as shown in said figure and the package would be somewhat higher than as illustrated.

Figure 22:
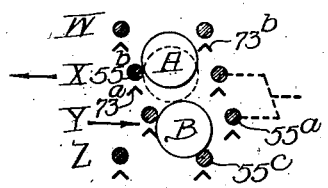

In Fig. 22 the frame Y is represented as having shifted still farther to the right, thereby carrying the package B nearer toward an upright position upon the shaft $55^c$. The simultaneous shifting of the frame X has permitted the package A to slip between the shaft $55^b$ and the member $73^b$ and drop onto the package B, as shown in dotted lines.

Figure 23:
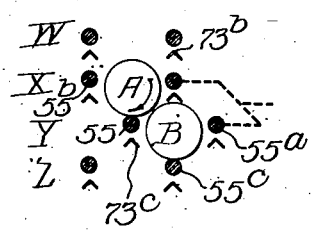

In Fig. 23, frames X and Y are illustrated as having completed their shifting movements, all of the frames being at rest. The package B has been moved into a substantially vertical position upon the shaft $55^c$, while the shaft 55 has been moved under the package A.

The frame 47 occupies two different positions when receiving packages from the distributer. When these parts are arranged as shown in Fig. 3, the packages to be delivered to the frame 47 in its extreme left position must move farther than those packages which are to be delivered to said frame when in its extreme right position; therefore a greater amount of movement of the distributer is required to deliver packages to said frame 47 in its extreme left position. As shown, the distributer has just completed a movement, and the six rows of packages which are now supported by the partitions 49 have reached the vertical planes through which they are to descend step by step to the conveyer 74, and the frame 47 is about to shift to the right. This shifting will take place while the distributer is at rest, and the packages now resting upon the partitions 49 will move into the compartments between said partitions in the new positions of the latter, the packages now in said compartments having moved downward one step when released by the movement of the top frame 52 which moves simultaneously with the frame 47 and in the opposite direction.

In their new positions six of the partitions 49 will occupy the same vertical planes as the packages between said partitions do in Fig. 3, and another six rows of packages must be disposed above said partitions 49 before the frame 47 is again shifted. Package $a'$ must therefore move to a position over the partition 49 which then occupies the position now occupied by package $a^2$, and package $a^3$ must move to a position over the extreme left-hand partition 49 (which will occupy the position of package $a^4$). This movement of the packages $a'$ and $a^3$ and intermediate packages will require eleven movements of the distributer. The frame 47 will then shift to the left and cause the partitions 49 to move out from under the packages resting upon them, and said packages will move downward in the planes of the packages in the compartments of 47 as they are shown in Fig. 3; the partitions 49 will be in the positions as shown; the first of the next six rows of packages to be delivered to the frame 47 will be at the point now occupied by cross-bar $27^a$ of the distributer; and before the next shifting of the frame 47 this row of packages must move to the same position as that now occupied by package $a^6$, and to complete this movement will require thirteen movements of the distributer.

In moving across the frame 47 the packages in the distributer roll over the packages in said frame and over the partitions 49. It will be seen from Fig. 3 that said partitions extend up to the plane of the upper portions of the packages in the frame 47, the packages in the distributer moving across the filled frame without difficulty. The guards $39^a$, 43 and $83^a$ prevent vertical displacement of packages which might otherwise occur as they move along, owing to changes in form due to bursting, or to other causes.

It will be remembered that the star wheel 6 and the inlet valve 9 are connected to rotate in unison, two movements of the star wheel releasing a row of packages, and every two movements of the valve bringing a compartment 14 into position to receive a row of packages. As a compartment 14 is brought into register with the opening 12, the packages therein drop into the space 28 between bars 27 in the distributer which has been placed in proper relation with said opening by the last two movements of said distributer.

Leaving out of consideration the space devoted to the distributer and the conveyer 74, it will be seen by an inspection of Figs. 3 and 19 that the cylindrical packages herein shown are arranged within the retort as compactly as possible. The partitions 55 73 for controlling the gravitating movements of the packages occupy the interstices among the packages and take up substantially no space that might be filled by packages.

In practice, this highly desirable compactness may be attained in machines designed for handling two-pound cans, each $3\frac{3}{8}$ inches in diameter, by making the distance between the centers of the shafts 55 in each frame $4\frac{5}{8}$ inches; said shafts $\frac{7}{8}$ inches in diameter; the members $73\frac{7}{8}$ inches in width; the distance between the center of each shaft 55 and the lower edge of the adjacent member 73 $1\frac{3}{16}$ inches; and the distance between the horizontal planes passing through the axes of shafts 55 of two adjacent frames $2\frac{5}{8}$ inches. The frames 47 52 are reciprocated through distances substantially equal to one-half the diameter of the packages. As will appear from the drawings and the foregoing description, the partitions 55 73, in the present embodiment, are relatively narrow in order that the rows of cans in a horizontal layer shall be close together. The upper edges of said partitions in a given frame are above the horizontal plane of the centers of the cans in the horizontal layer lying within said frame, so as to support the cans of the next higher layer.

It will be seen from Figs. 21 and 22, that the package B drops through a greater height than the package A, and that it is the package which lies between the partitions of the stationary frame which has the shorter fall. In the machine herein illustrated, in which two frames are shifted at a time, the package which has the greater drop at a given time will have the shorter drop the next time. It will therefore be seen that all packages receive, on the average, the same amount of agitation due to the falls alluded to.

As is well known, different goods require different lengths of treatment. The length of treatment obtained with the machine herein shown may be varied by varying the speed at which the machine is driven. There is a limit, however, to the speed at which it is practicable to shift the frames 47 52. Instead, therefore, of speeding up the machine as a whole, it may in some cases be preferable to speed up the valve 9, the distributer, the conveyer 74 and the outlet valve 17, and to shift the frames 47 52 oftener by placing more lugs 121 upon the chains 122. I have deemed it unnecessary to illustrate the means for varying the speed at which the parts mentioned may be driven, as any common or preferred means may be employed for this purpose.

The contents of the packages are agitated through the rotation and jarring of the packages caused by the shafts 55, said shafts being intermittently driven in opposite directions by means of the mechanism shown in Fig. 15. The packages, therefore, are rotated first in one direction and then in another while resting upon said shafts.

The contents of the packages are further agitated through the partial rotation given to the packages as they descend through the retort. Referring to Figs. 12 and 23, it will be seen that the package A will be rotated through a partial revolution in the direction indicated by the arrow on said package each time said package descends. The package B will be rotated in the opposite direction each time it descends.

I wish it to be understood that my invention is not limited to the mechanisms and relative arrangement of mechanisms herein shown and described, for various modifications will occur to persons skilled in the art.

I claim as my invention:

1. In a cooker or processer, in combination, a retort; and a plurality of similar frames movable with relation to one another and arranged one above the other, each frame having spaces therein to receive packages, each frame forming a bottom for the spaces in the next higher frame and each frame adapted to deliver its packages to the frame next below it.

2. In a cooker or processer, the combination of a retort through which the packages are moved by gravity and means for arresting the motion of the packages at intervals during their passage through said retort, said means comprising a tier of reciprocatory grid-like frames adapted to contain and support packages, the packages within one frame being supported by the next lower frame, adjacent frames being connected in pairs for movement in opposite directions and each frame being adapted to deliver its packages to the frame next below it.

3. In a cooker or processer, the combination of a retort through which the packages are moved by gravity; and means for controlling the movement of the packages through said retort comprising a tier of reciprocatory grid-like frames adapted to contain and support packages, the packages within one frame being supported by the next lower frame, and means for reciprocating said frames with relation to one another through a distance substantially equal to one-half the diameter of a package, to allow the packages to slip through said frames.

4. In a cooker or processer, in combination, a retort; two structures reciprocatory with relation to each other in opposite directions and arranged one above the other, the upper structure having a space therein for the reception of a package, the lower structure serving as a bottom for said space, relative movement between the structures serving to permit the package to drop out of said space, and means for moving a portion of the lower structure to agitate the package.

5. In a cooker or processer, in combination, a retort; two frames reciprocatory with relation to each other in opposite directions and arranged one above the other, the upper frame having a space therein for the reception of a package, the lower structure comprising a transverse member adapted to support a package lying in said space, relative movement between the frames serving to permit the package to drop out of said space, and means for rotating said member to agitate the package.

6. The combination of a cooker-retort adapted to contain steam under pressure, a settling tank in free communication with the lower portion of said retort, a hot water tank connected to said settling tank, floatation-controlled means in said settling tank for controlling communication between said tanks, a pump for drawing hot water from said water tank, and package-spraying means in operative relation to the retort inlet and supplied with hot water by said pump.

7. In a cooker or processer, the combination of a retort, a tier of reciprocatory frames in said retort, said frames being adapted to contain and support packages, and comprising agitating shafts, wheels on said shafts, and driving means in said retort in operative engagement with said wheels.

8. In a cooker or processer, the combination of a retort, a tier of reciprocatory frames in said retort, said frames being adapted to contain and support packages and comprising agitating shafts, wheels on said shafts, driving means in said retort in operative engagement with said wheels, and means for actuating said driving means to rotate the shafts alternately in opposite directions.

9. In a cooker or processer, in combination, two parallel grid-like frames, one below the other, the lower frame being adapted to support packages lying in the upper frame, means for reciprocating said frames, an endless conveyer having a portion thereof extending parallel with and above the upper frame for placing packages in said upper frame, means for placing packages on said conveyer, and a retort inclosing said frames and conveyer.

10. In a cooker or processer, in combination, a vertically extending retort through which packages may move in a plurality of paths; means for admitting packages to said retort; and means within the retort for distributing the packages from the admitting means to the initial ends of the various paths of movement, said distributing means comprising two endless parallel belts, transverse bars connecting said belts and forming package-receiving spaces between them, wheels for supporting said belts, said belts comprising an upper run and a lower run which runs extend in a horizontal plane transversely of the retort, and means for supporting packages lying in the spaces of the upper run of said belts.

11. In a cooker or processer, in combination, a vertically extending retort through which packages may move in a plurality of paths; means for admitting packages to said retort; and means for distributing the packages from the admitting means to the initial ends of the various paths of movement, said distributing means comprising two endless parallel belts, transverse bars connecting said belts and forming package-receiving spaces between them, wheels for supporting said belts, said belts comprising an upper run and a lower run which runs extend in a horizontal plane transversely of the retort, and means for supporting packages lying in the spaces of the upper run of said belts, guide means for the packages while passing from the upper to the lower run of said belts, and guide means above the packages in the upper and lower runs of said belts.

12. In a cooker or processer, in combination, a retort; a plurality of reciprocatory frames in said retort adapted to contain and support packages; and means for reciprocating said frames comprising a cam, cam-actuated means connected with said frames, a lever attached to said cam, and means arranged to engage said lever for moving said cam.

13. In a cooker or processer, in combination, a retort; a plurality of reciprocatory frames in said retort adapted to contain and support packages; and means for reciprocating said frames comprising a cam, cam-actuated means connected with said frames, a lever attached to said cam, and an endless belt carrying a lug adapted to engage said lever for rocking said cam.

14. In a cooker or processer, in combination, a retort; a plurality of reciprocatory frames in said retort, said frames being adapted to contain and support packages; the packages within one frame being supported by the next lower frame; means connecting adjacent frames in pairs for movement in opposite directions to allow the packages to slip through said frames; cams for actuating said connecting means; and means for successively actuating said cams.

15. In a cooker or processer, the combination of a retort, means for admitting packages to the retort, movable means for forming paths of movement within the retort for the packages, said means having a plurality of operative positions and means within the retort for distributing the entering packages to said path-forming means, said distributing means being adapted and arranged to distribute packages to different operative positions of the path-forming means.

16. In a cooker or processer, the combination of a retort, means for admitting packages to the retort, movable means for forming vertical paths of movement within the retort for the packages, and an endless package-conveyer extending into operative receiving relation to the admitting means, and having a lower run disposed above the path-forming means, the latter being adapted to support packages advanced by said lower run and being adapted to receive such packages in any of its operative positions.

17. In a processing machine, in combination, a retort; means in said retort for holding packages, comprising a substantially vertical series of supports; and means for successively moving said supports out from under the packages.

18. In a cooker or processer, in combination, a retort; a valve casing in operative relation to said retort; a valve rotatably mounted in said casing; and a stationary tube extending axially through one end of said valve casing, said valve having a port therein arranged to be brought into communication with said tube during the rotation of the valve.

19. In a cooker or processer, in combination, a retort; a valve casing in operative relation to said retort; a valve in said casing having a recess in one of its ends; a member in said recess; and a tubular stem attached to said member and extending axially through one end of said valve casing and being held against rotation, said member having a port therein in communication with said tubular stem, and said valve having a port therein arranged to be brought into register with the port in said member during the rotation of the valve.

20. In a cooker or processer, in combination, a retort; means for discharging packages from the retort; means for cooling the discharged packages; and an undulatory conveyer in operative relation to said discharging means within the retort and cooling means, said conveyer being adapted to agitate the packages.

21. The combination, with a cooker or processer having a discharge valve, said valve having a compartment therein extending longitudinally of the valve and adapted to contain a row of packages, of a conveyer extending longitudinally of said compartment and arranged in position to receive the rows of packages discharged from said compartment whereby the packages are disposed in single file on the conveyer.

22. A package-controlling frame for cookers or processers, having partitions forming package-receiving spaces the width of each space being greater than the diameter of a package, each of said partitions consisting of a stationary member and a movable agitating member, the movable member being located parallel with and above the stationary member.

23. In a processer, a retort; a tier of horizontally-extending package-controlling frames within the retort, said frames comprising relatively narrow partitions between which packages may lie, the upper edges of the partitions of a given frame being above the horizontal plane of the centers of the packages lying within said frame, so as to support the packages lying within the next higher frame, and means for horizontally reciprocating said frames with relation to one another to withdraw the partitions of each frame in turn from beneath the packages lying within the next higher frame.

24. In a cooker or processer, the combination of a retort, means for admitting packages to the retort, a tier of horizontally reciprocable frames having spaces therein to receive packages, the packages within one frame being supported by the next lower frame, each frame being arranged to discharge its packages to the frame next below it and means operatively associated with the admitting means and extending above the tier of frames and being arranged to discharge packages to the top frame when the latter is at either of its extremes of movement.

25. In a cooker or processer, in combination, a retort, a plurality of reciprocatory grid-like frames in said retort adapted to contain and support packages the packages within one frame being supported by the next lower frame; frame-reciprocating elements; endless chains; and members on said chains adapted to engage and actuate said frame-reciprocating elements.

26. In a cooker or processer, the combination of a retort and three horizontal structures in the retort, arranged one above another, and adapted to support two layers of packages, the packages in one layer extending within the spaces between the packages in the other layer and means to horizontally shift the upper and lower structures with relation to the middle structure to release the lower layer and cause the upper layer to descend onto the lower structure.

27. In a cooker or processer, the combination of a retort and means within the retort for supporting horizontal layers of packages for controlled gravitational movement, each package in one layer extending within the space between two adjacent packages in another layer, said supporting means comprising an individual support for each layer.

28. In a cooker or processer, in combination, a retort; a valve casing in operative relation to said retort; a valve in said casing; a tubular trunnion for said valve; and a ported exhaust-valve member arranged to discharge fluid through said tubular trunnion, said valve having an exhaust port therein arranged to be brought into communication with said exhaust-valve member during the rotation of the valve.

29. In a cooker or processer, the combination of a retort, means for admitting packages to the retort, movable means for forming paths of movement within the retort for the packages, said path-forming means including a horizontally reciprocable frame having a space therein to receive packages, said frame having a plurality of operative positions and means within the retort for distributing the entering packages to said path-forming means, said distributing means being adapted and arranged to discharge packages to said frame in any of the operative positions of the latter.

GEORGE A. WALKER.

Witnesses:
C. PAUL PARKER,
GEORGE L. CHINDAHL.